Dec. 7, 1948.  E. W. HALVORSEN  2,455,863
SPRING COILING MACHINE EMBODYING
A CHANGE SPEED MECHANISM

Filed Dec. 26, 1946  5 Sheets-Sheet 1

Fig. 1

INVENTOR.
ELMER W. HALVORSEN
BY S. Jay Teller
ATTORNEY

Fig. 2

Dec. 7, 1948.  E. W. HALVORSEN  2,455,863
SPRING COILING MACHINE EMBODYING
A CHANGE SPEED MECHANISM
Filed Dec. 26, 1946  5 Sheets-Sheet 3

INVENTOR.
ELMER W. HALVORSEN
BY
S. Jay Teller
ATTORNEY

Patented Dec. 7, 1948

2,455,863

UNITED STATES PATENT OFFICE 2,455,863

SPRING COILING MACHINE EMBODYING A CHANGE SPEED MECHANISM

Elmer W. Halvorsen, Worcester, Mass., assignor to The Torrington Manufacturing Company, Torrington, Conn., a corporation of Connecticut Application December 26, 1946, Serial No. 718,534

39 Claims. (Cl. 153—65)

1

The invention relates to a spring coiling machine of the type adapted for intermittently feeding predetermined lengths of wire, the said lengths of wire being coiled during feeding to form springs, and the wire being cut off upon the completion of feeding and coiling. While not necessarily so limited, the invention is particularly applicable to a spring coiling machine such as that shown in Patent No. 2,119,002 issued May 31, 1938 to Bergevin and Nigro.

The general object of the invention is to provide improved means for operating and controlling the shaft which actuates the feed rollers and the cam shaft which times the cycle and actuates the cutoff mechanism and also certain other mechanisms of the machine.

Pursuant to the general object of the invention, a change speed or variable speed mechanism is provided which is operated alternately at two normally fixed but differing speeds and which, in conjunction with associated gearing, serves at one speed to rotate the shaft which drives the feed rollers and serves at its other speed to hold the said shaft stationary. The first said speed is adjustable in accordance with the length of the springs to be wound.

Also pursuant to the general object of the invention, the change speed or variable speed mechanism, in conjunction with associated gearing, serves to rotate the cam shaft at two different speeds, the higher speed being utilized for operating the cutoff mechanism and the lower speed being utilized for timing the cycle and for operating the coiling mechanism. The higher speed of the cam shaft is constant and therefore the cutoff mechanism is always operated rapidly and without loss of time. The lower speed of the cam shaft is adjustable in accordance with the length of the springs to be wound, the shaft being rotated slowly for long springs and faster for short springs.

In addition to the general object of the invention which has been stated, there are various other more specific objects which will be apparent from the drawings and from the following specification and claims.

In the drawings I have shown in detail a preferred embodiment of the invention, but it will be understood that various changes may be made from the construction shown, and that the drawings are not to be construed as defining or limiting the scope of the invention, the claims being relied upon for that purpose.

Of the drawings:

Fig. 1 is a front view of the upper part of a

2 machine embodying the invention, certain parts being broken away in order that other parts may more clearly appear.

General organization

Figure 1:
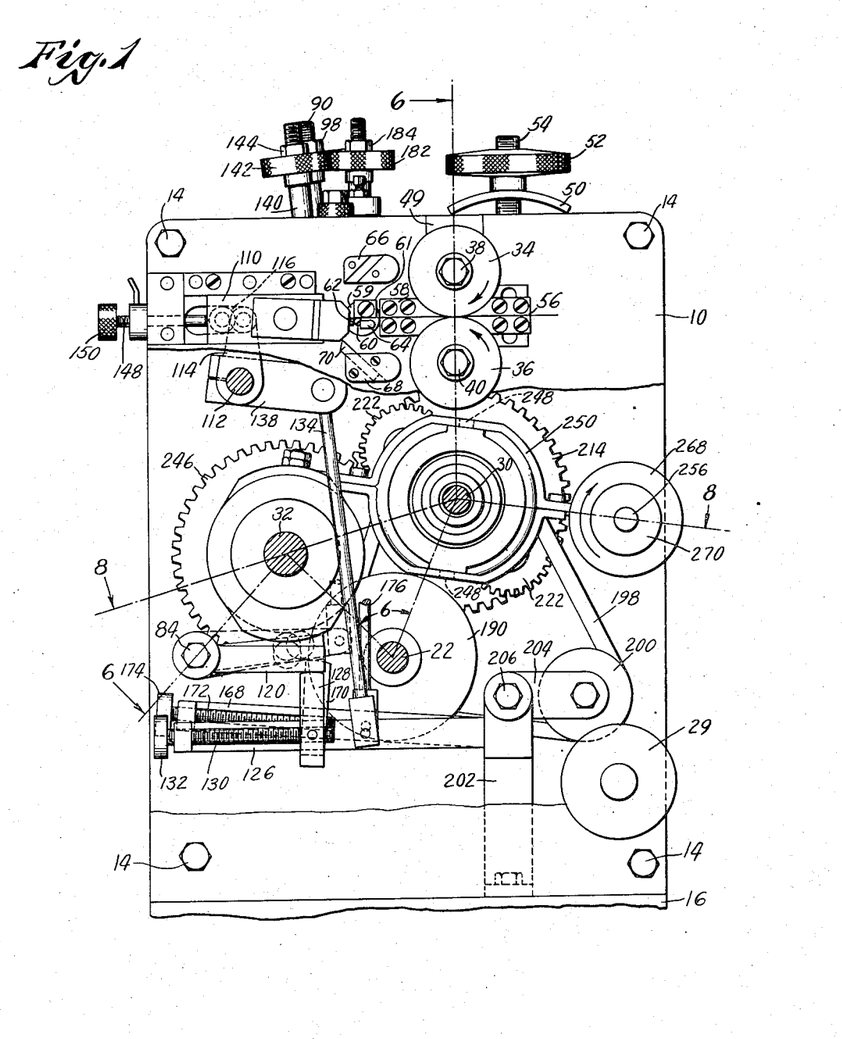
Figure 2:
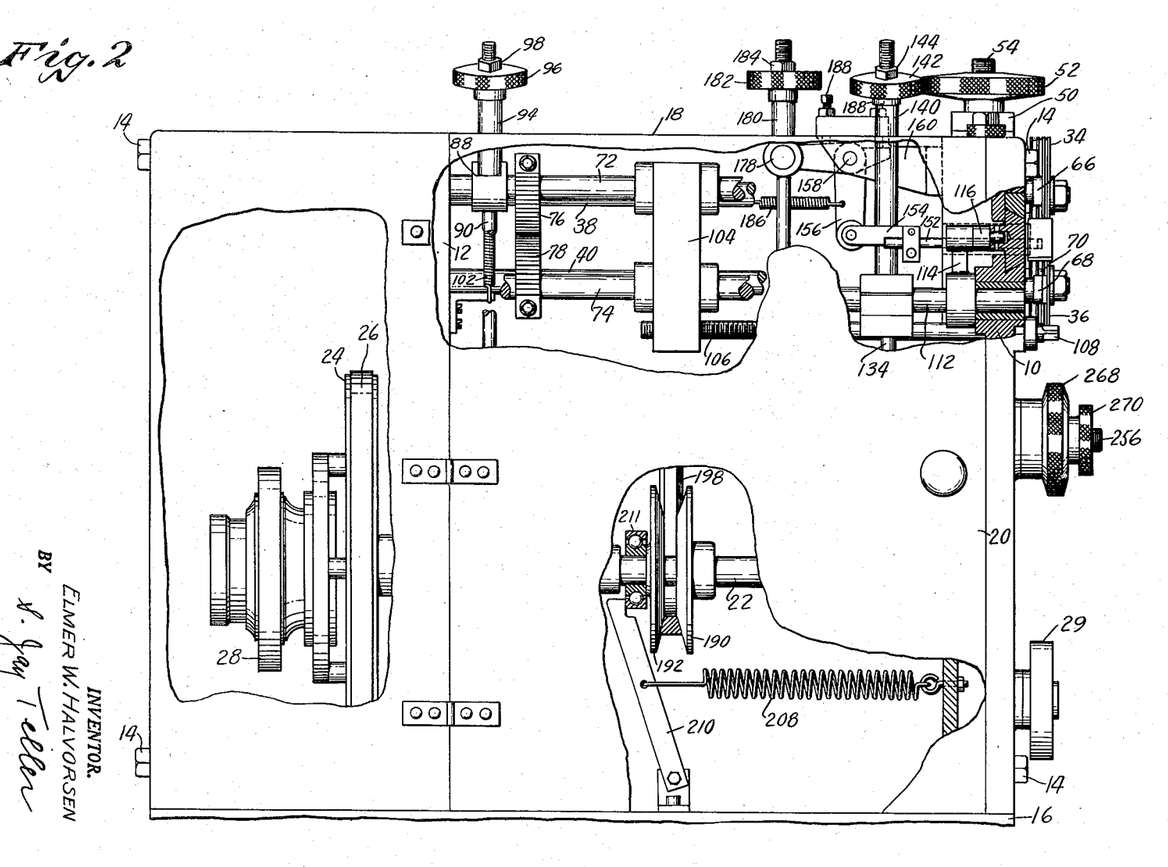
Fig. 2 is a left side view of the machine with certain parts broken away in order that other parts may more clearly appear.

Referring to the drawings, particularly Figs. 1 and 2, the main frame of the machine comprises a front plate 10 and a rear plate 12 which are suitably connected by tie rods at 14, 14. The main frame is supported on a base 16, of which only a fragment is shown in the drawings. The space between the front and rear plates 10 and 12 is closed by a cover 18 at the top and by suitable side plates, the side plate at the left being designated 20 in Fig. 2. The side plates are preferably hinged in order to provide access to the interior.

Extending longitudinally of the machine and mounted in suitable bearings supported by the front plate 10 and the rear plate 12 is a main drive shaft 22. This shaft is driven by any suitable means, and its speed is normally constant for any one setting. However, its speed may be increased or decreased when the set-up is changed to make different springs. As shown in Fig. 2, a belt pulley 24 is rotatably mounted on the shaft 22, this pulley being driven by means of a belt 26 extending over a pulley (not shown) which is located in the base of the machine and which is driven by a suitable source of power such as an electric motor. For changing the speed of the shaft 22, a variable speed motor may be provided or there may be a suitable change speed mechanism associated with the motor. The pulley 24 may be operatively connected with the shaft 22 or disconnected therefrom by means of a clutch 28 which can be manually controlled by means of a longitudinally movable hand knob 29 located at the front of the machine.

Extending longitudinally of the machine and mounted in suitable bearings supported by the front plate 10 and the rear plate 12 is an intermediate shaft 30. This shaft is driven, ordinarily intermittently, from the drive shaft 22 by means of suitable mechanism to be hereinafter described in detail. There is also provided a cam shaft 32 which extends longitudinally of the machine and is mounted in suitable bearings in the front plate 10 and the rear plate 12. This shaft is also driven from the drive shaft 22 by means of suitable mechanism to be hereinafter described. The timing of the various parts of the machine is such that the cam shaft 32 ordinarily makes one complete rotation for each spring to be coiled.

At the front of the machine are feed rollers 34 and 36 which are secured to longitudinal shafts 38 and 40 mounted in suitable bearings in the front and rear plates 10 and 12. The shafts 38 and 40 are connected by meshing gears 42 and 44. At the rear end of the intermediate shaft 30 is a gear 46 which meshes with a gear 48 secured to the feed roller shaft 40. Thus the shaft 30 serves in conjunction with the said gearing as the means for driving the feed rollers.

The wire to be coiled is fed to the machine from the right and, in order that the rollers may firmly grip the wire, the front bearing for the upper shaft 38 is carried by a block 49 which is vertically movable within narrow limits. Downward pressure is applied to the block 49 by means of a bow spring 50 which may be tensioned by a hand wheel 52 threaded on a stud 54. Before reaching the rollers the wire passes through a pair of guides 56. The rollers 34 and 36 are rotated in the directions indicated by arrows in Fig. 1 and when the wire is entered between them they serve to move it horizontally, drawing it through the guides 56. A second pair of guides 58 is provided for the wire after it has passed the feed rollers.

The rollers are provided with registering annular grooves of different sizes for receiving wires of different sizes. It will be understood that only one set of grooves is used at any one time, the grooves to be used being selected in accordance with the diameter of the wire.

Figures 3, 5:
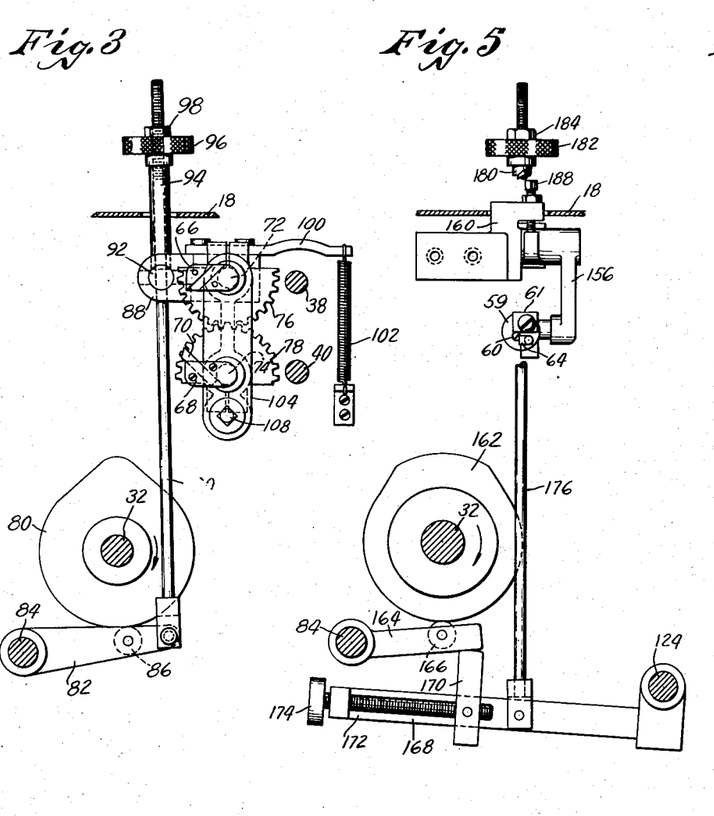
Fig. 3 is a view showing the cutoff mechanism and the parts for operating it, the lower part of this view being a transverse section taken along the line 3—3 of Fig. 6.
Fig. 5 is a view showing the parts for operating the pitch mechanism, the lower part of this view being a transverse section taken along the line 5—5 of Fig. 6.

Adjacent the path of the wire at the left of the guide 58 is a tool holder 59 which is entered in a hole in the front plate 10. As shown in Figs. 1 and 5, the tool holder carries an arbor 60 around which the wire is coiled to form the desired spring, and the tool holder also carries a guide block 61 for maintaining the wire in position adjacent the arbor. When a right hand spring is to be coiled the arbor is below the path of the wire, as shown, and the guide block is above the path of the wire. Adjacent the arbor 60 is a coiling point 62 which engages the wire to coil it downwardly around the arbor 60. The diameter of the coil is determined by adjusting the coiling point 62 toward or away from the arbor. Carried by the tool holder 59 and associated with the arbor 60 is a pitch tool 64 which engages the partly coiled wire below the initial path thereof to deflect it longitudinally in such a manner as to control the pitch of the spring. The pitch tool 64 can be adjusted longitudinally to vary the pitch, as will presently be explained.

The drawings show the tool holder 59, together with the arbor 60 and the guide block 61 and the pitch tool 64, in the positions for coiling right hand springs. The tool holder is reversible, end for end, for coiling left hand springs, and it carries at its opposite end a separate arbor, a separate guide block and a separate pitch tool. When the tool holder is so reversed the said separate arbor and the said separate pitch tool are positioned above the path of the wire and the said separate guide block is positioned below the path of the wire. When the tool holder is reversed for left hand springs, the coiling point 62 is correspondingly adjusted, so as to coil the wire upwardly instead of downwardly around the arbor.

By mechanism to be described, the coiling point 62 may be adjusted with respect to the arbor to vary the diameter of the springs. By other mechanism to be described, the pitch tool 64 may be moved longitudinally to vary the pitch of the springs. The diameter mechanism and the pitch mechanism will sometimes be hereinafter referred to singly or collectively as "coiling mechanism."

Also associated with the arbor 60 is a cutoff mechanism comprising two oscillatory tool carriers 66 and 68. These tool carriers are mounted and controlled, as hereinafter explained, to oscillate in opposite directions, the left end of the lower carrier 68 moving upward from the position shown in Fig. 1 and the left end of the upper tool carrier 66 moving downward. A cutoff tool 70 is mounted in one or the other of the carriers 66 and 68. When a right hand spring is being made the tool 70 is mounted in the lower carrier 68 and when the carrier is oscillated as described the tool swings upward and inward so as to serve in cooperation with the arbor 60 to cut off the wire when the spring is complete. When a left hand spring is being made the tool 70 is mounted in the upper carrier 66 which moves downward and inward to cut off the wire in the manner described.

*Means for operating cutoff mechanism*

Figure 6:
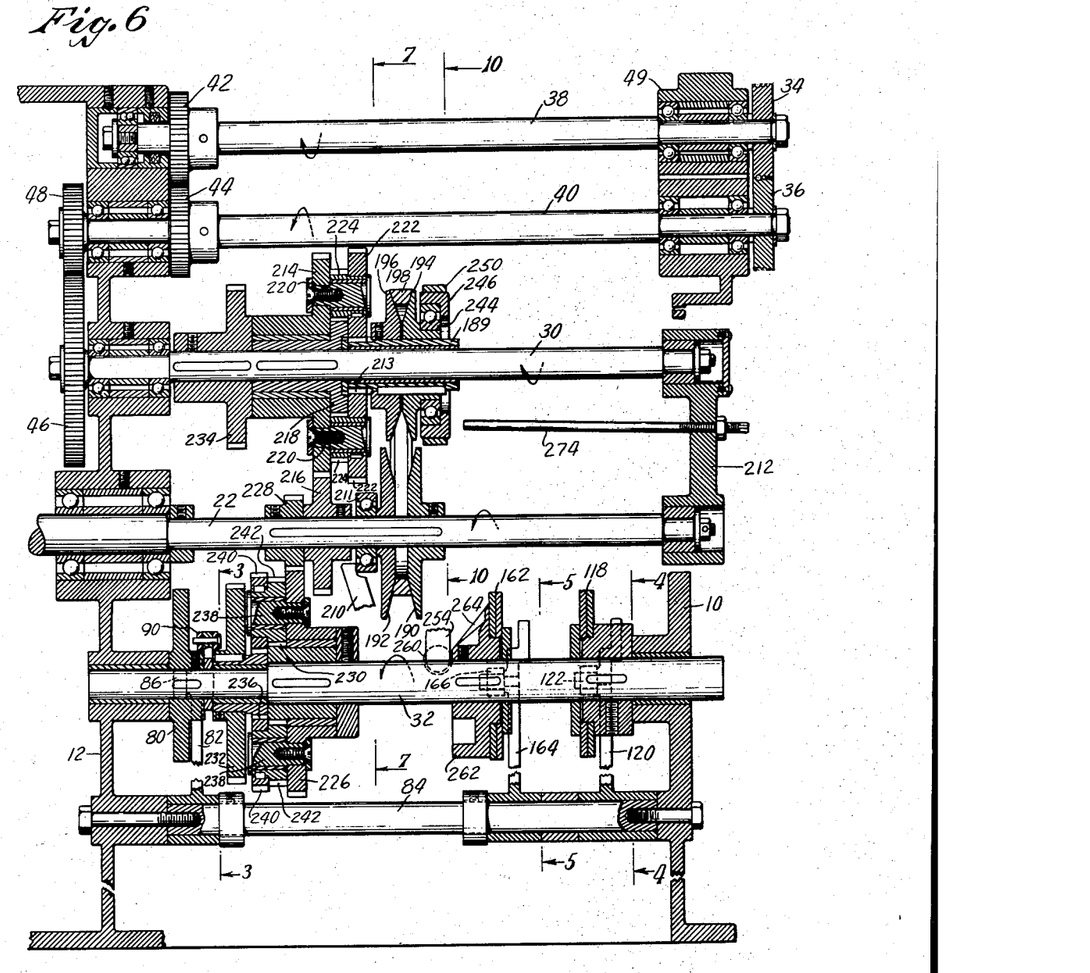
Fig. 6 is a longitudinal sectional view taken along the lines 6—6 of Fig. 1.

The mechanism for operating the carriers for the cutoff tool is shown in Figs. 2, 3 and 6. Longitudinal rockshafts 72 and 74 are provided which are mounted in suitable bearings in the front plate 10 and in the rear plate 12. The tool carriers 66 and 68 are carried by these rockshafts at the front ends thereof. Secured to the respective rockshafts are gear segments 76 and 78 which mesh with each other so as to cause the two shafts to rock uniformly and in opposite directions. Secured to the cam shaft 32 is a cam 80. A rock lever 82 is provided adjacent the cam 80, this being pivoted on a longitudinal pivot rod 84 which extends between and is carried by the front plate 10 and the rear plate 12. The rock lever 82 carries a follower roller 86 which engages the outer surface of the cam 80.

Secured to the shaft 72 is an arm 88. A link 90 is provided, the lower end of which is pivotally connected with the end of the rock lever 82 and the upper portion of which extends through a hole in a pin 92 carried by the arm 88. The upper portion of the link 90 is surrounded by a sleeve 94, the lower end of which abuts against the pin 92 and the upper end of which is engaged by a knob 96, accessible at the top of the machine above the top cover 18. The knob 96 engages the threaded upper portion of the link 90 and may be secured in adjusted position by means of a lock nut 96. Associated with the arm 88 is an arm 100 which extends in the opposite direction and is engaged by a tension spring 102.

By referring particularly to Fig. 3, it will be noted that the cam 80 has a long circular portion and a relatively steep rise or peak. As already stated, the cam ordinarily makes one complete rotation for each spring and it will be seen that during most of the rotation the roller 86 and the parts directly associated therewith are in their uppermost positions, the tool carriers 66 and 68 being held in the positions shown in Fig. 1 with the tool 70 out of operative position. The timing of the machine is such that immediately upon the completion of the coiling of the spring the roller 86 is engaged by the rise of the cam 80 so as to be pushed downward, thus moving the link 90 downward and rocking the shafts 72 and 74, the upper shaft 72 being moved in the counter-clockwise direction and the lower shaft 74 being moved in the clockwise direction. This enables the cutoff tool to cut off the wire in the manner already stated. The relationship of the cutoff tool to the arbor during the cutoff operation can be varied by turning the knob 96. Adjustment of the knob serves to adjust the effective length of the link 90, the arm 88 being correspondingly adjusted to turn the shafts 72 and 74 as may be required.

The shafts 72 and 74 are longitudinally adjustable within narrow limits in order to locate the cutting tool 70 in position to properly engage the wire. This is necessary, particularly in view of the fact that the wire may be entered in any one of the several grooves in the rollers 34 and 36. A yoke 104 is provided which has apertures for receiving both of the shafts 72 and 74. Collars secured to the shafts prevent relative longitudinal movement of the yoke. A longitudinal rod 106 is provided, the rear end of which is threaded and engages a threaded aperture in the yoke 104. The front end of the rod 106 is at the front of the machine and is squared or otherwise shaped, as indicated at 108, to receive a wrench. It will be seen that by means of the rod 106 the shafts 72 and 74 may be moved outward or inward to properly position the tool 70. There is sufficient flexibility or play in the link 90 and the parts associated therewith to permit the relatively small longitudinal adjustment.

*Means for operating diameter mechanism*

The mechanism for operating and controlling the coiling point 62 to regulate the diameter of the springs is shown in Figs. 1, 2, 4 and 6. The coiling point is carried by a transversely adjustable slide 110 guided in the front plate 10. A longitudinal rockshaft 112 is provided and this shaft carries an arm 114, the upper end of which is connected by means of a link 116 with the said slide 110. Carried by the cam shaft 32 is a cam 118. Adjacent the cam 118 is a rock lever 120 which is pivoted on the rod 84 and which carries a follower roller 122 adapted to engage the outer face of the cam. Pivotally mounted on a longitudinal pivot rod 124 is an arm 126. Adjustable along the arm 126 is an abutment 128, this being adjustable by means of a screw 130 and a knob 132. The upper end of the abutment 128 engages the lower face of the rock lever 120.

Figure 4:
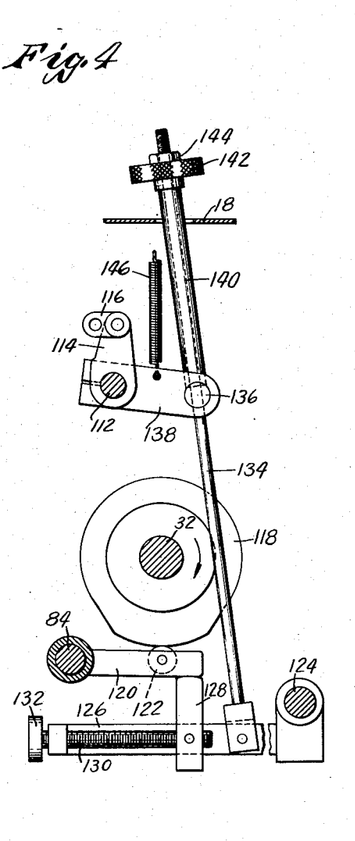
Fig. 4 is a view showing the diameter mechanism and the parts for operating it, the lower part of this view being a transverse section taken along the line 4—4 of Fig. 6.

A link 134 is provided, the lower end of which is pivotally connected with the arm 126, and the upper portion of which extends through a hole in a pin 136 carried by an arm 138 secured to the rockshaft 112. The upper portion of the link 134 is surrounded by a sleeve 140, the lower end of which abuts against the pin 136, and the upper end of which is engaged by a knob 142 accessible at the top of the machine above the top cover 18. The knob 142 engages the threaded upper portion of the link 134 and may be secured in adjusted position by means of a lock nut 144. A spring 146 is provided for biasing the shaft 112 in the counterclockwise direction, thus correspondingly biasing the various parts directly associated with the shaft.

As shown in Fig. 4, the cam 118 has a contour which is shaped in accordance with the desired shape of the springs to be formed. By changing the form of the cam 118 it is possible to produce springs of varying contour such as cone or tapered springs, barrel springs, or two-diameter springs. The cam ordinarily makes one complete rotation during the formation of each spring and the timing is such that it serves, by means of the various parts described, to move the slide 110 and the coiling point 62 transversely as the spring is being formed. The cam controls the pattern of movement of the slide and coiling point, but the positional relationship of the slide and coiling point with respect to the cam can be varied by means of the knob 142 which serves to adjust the effective length of the link 134. Thus the knob can be used to adjust the diameter of the spring without changing the shape thereof. As already stated, the shape of the cam 118 determines the general shape of the spring. This general shape may be modified within reasonable limits by adjusting the abutment 128 along the arm 126 by means of the knob 132.

If springs of uniform diameter are to be coiled, the knob 142 is turned to lower the roller 122 to such an extent that it is out of engagement with the cam 118. The coiling point 62 is not then controlled by the cam 118, but it is controlled by an adjusting screw 148 engaging the slide 110 and having a knob 150. By means of the knob and screw the slide 110 can be moved to bring the coiling point to the proper position for springs of any desired diameter. In other instances, the coiling point 62 is adjusted by means of the screw 148 so that the cam 118 is effective during only a reduced portion of its cycle. The coiling point is then controlled partly by the cam and partly by the screw.

*Means for operating pitch mechanism*

The mechanism for operating and controlling the pitch tool 64 is shown in Figs. 2, 5 and 6. The pitch tool is carried by a longitudinally movable rod 152 which is adjustably clamped to a block which is pivotally connected with a link 154. The link is pivoted to the lower end of one arm of a bell crank 156 which is pivoted at 158 to a bracket 160 carried by the front plate 10. Carried by the cam shaft 32 is a cam 162. Adjacent the cam is a rock lever 164 which is pivoted on the rod 84 and which carries a follower roller 166 adapted to engage the outer face of the cam. Pivotally mounted on the longitudinal pivot rod 124 is an arm 168. Adjustable along the arm 168 is an abutment 170, this being adjustable by means of a screw 172 and a knob 174. The upper end of the abutment 170 engages the lower face of the rock lever 164. A link 176 is provided, the lower end of which is pivotally connected with the arm 168 and the upper portion of which extends through a hole in a pin 178 carried by the horizontal arm of the bell crank 156. The upper portion of the link 176 is surrounded by a sleeve 180, the lower end of which abuts against the pin 178 and the upper end of which is engaged by a knob 182 accessible at the top of the machine above the top cover 18. The knob 182 engages the upper threaded portion of the link 178 and may be secured in adjusted position by means of a lock nut 184. A spring 186 is provided for biasing the bell crank 156 in the clockwise direction, thus correspondingly biasing the various parts directly associated therewith.

As shown in Fig. 5, the cam 162 has a contour which is shaped in accordance with the desired variations in the pitch of the springs to be formed. By changing the form of the cam 162 it is possible to produce springs having different pitches at different portions thereof. The cam ordinarily makes one complete rotation during the formation of each spring and the timing is such that the rod 152 and the pitch tool 84 are moved longitudinally to change the pitch as the spring is being formed. The cam controls the pattern of the movement of the rod and pitch tool, but this general pattern may be modified within reasonable limits by adjusting the abutment 170 along the arm 168 by means of the knob 174.

If springs of uniform pitch are to be coiled, the knob 182 is turned to lower the roller 166 to such an extent that it is out of engagement with the cam 162. For adjusting the position of the pitch tool when it is not controlled by the cam, there are two set screws 188, 188 carried by the bracket 160. These set screws directly engage the bell crank 156 and by turning the screws the bell crank can be moved in one direction or the other to bring the pitch tool into the position necessary for the desired pitch.

The machine as thus far described is similar to that shown in the aforesaid Patent No. 2,119,002, and the described mechanisms do not of themselves constitute any part of the present invention.

*Means for rotating and controlling intermediate shaft and cam shaft*

It has already been stated that the intermediate shaft 30 is driven from the main drive shaft 22. It is so driven by means of a rotatable member which is rotated at different speeds by means of a change speed or variable speed drive mechanism actuated by the main drive shaft. While the invention is not necessarily so limited, the rotatable member is preferably a sleeve 189 rotatable on the intermediate shaft.

Preferably and as shown, the mechanism for rotating the sleeve 189 is a variable speed mechanism which comprises cone pulleys 190 and 192 rotatable with the shaft 22 and cone pulleys 194 and 196 rotatable with the sleeve. A belt 198 extends around the cone pulleys of the two pairs, the sides of the belt being beveled to conform to the angles of the cones. Preferably, in order that the belt 198 may be properly tensioned it also extends around an idler sheave 200 carried by a bracket 202 and by a link 204 pivoted to the bracket at 206. The link 204 can be swung about its axis to properly tension the belt and then the link can be clamped in adjusted position.

One of the cone pulleys of each pair is longitudinally adjustable along its supporting element and the other pulley of each pair is rigidly secured to its supporting element. As shown, the lower pulley 192 at the left is longitudinally movable and the upper pulley 194 at the right is longitudinally movable. Means is provided for longitudinally moving one of the pulleys, as for instance the pulley 194, to adjust its relationship to the companion fixed pulley 196 and to thereby vary the effective diameter of the two pulleys, that is, to vary the position at which they are engaged by the belt 198. The other movable pulley 192 is spring-pressed toward the companion fixed pulley and the position of this pulley is automatically adjusted by means of the belt in accordance with the adjustment of the other movable pulley 194. As shown, the means for controlling the pulley 192 comprises a spring 208 which is connected with a pivoted lever 210 as shown in Fig. 2. The upper end of the lever 210 engages the outer face of a ball bearing 211 which is adjacent the pulley 192. When the pulley 194 is moved longitudinally by mechanism to be presently described in detail, the effective diameter of the pulleys 194 and 196 can be decreased or increased and the effective diameter of the pulleys 190 and 192 is correspondingly increased or decreased through the action of the belt. Thus the speed of the pulleys 194 and 196 and of the sleeve 189 can be varied with respect to that of the shaft 22.

Preferably the bearings for the front ends of the shafts 22 and 30 are mounted in a plate 212 which is in an opening in the front plate 10 and which is detachably bolted in place. When the belt 198 is to be put in place or removed, the plate 212 is removed, thus enabling the belt to be passed over the ends of the two shafts and through the opening in the plate 10.

Connected with the rotatable sleeve or member 189 is gearing which normally serves upon rotation of the member at one speed to rotate the intermediate shaft 30 and the feed rollers in the directions to effect feeding and which serves upon rotation of the member at another speed to maintain the said intermediate shaft and the feed rollers stationary. The gearing preferably also normally serves upon rotation of the member 189 at the first said speed to rotate the cam shaft 32 at a relatively low speed and serves upon rotation of the said member at the second speed to rotate the said cam shaft at a higher speed. In order that the sleeve or member may engage the said gearing, it is provided with a sun gear 213 carried thereby or formed integrally therewith.

The gearing for rotating the intermediate shaft 30 includes a planet pinion carrier gear 214 which is preferably rotatable concentrically with respect to the shaft 30 and which meshes with a gear 216 fixed on the drive shaft 22. Inasmuch as the shaft 22 rotates at constant speed, the gear 214 also rotates at constant speed. Secured to the shaft 30 for rotation therewith is a sun gear 218 and as shown, this gear 218 has a long hub on which the gear 214 rotates. The sun gear 218 is immediately adjacent the sun gear 213. Secured to the gear 214 are two bearing studs 220, 220 on which are mounted planet pinions 222, 222 and 224, 224. The planet pinions of each pair are rotatable in unison, one of them being mounted on the hub of the other. The planet pinions 222, 222 mesh with the before-mentioned sun gear 213 which is formed on the sleeve 189 and is rotatable with the pulleys 194 and 196. The planet pinions 224, 224 mesh with the sun gear 218 which is rotatable with the shaft 30.

Figures 7, 9, 10:
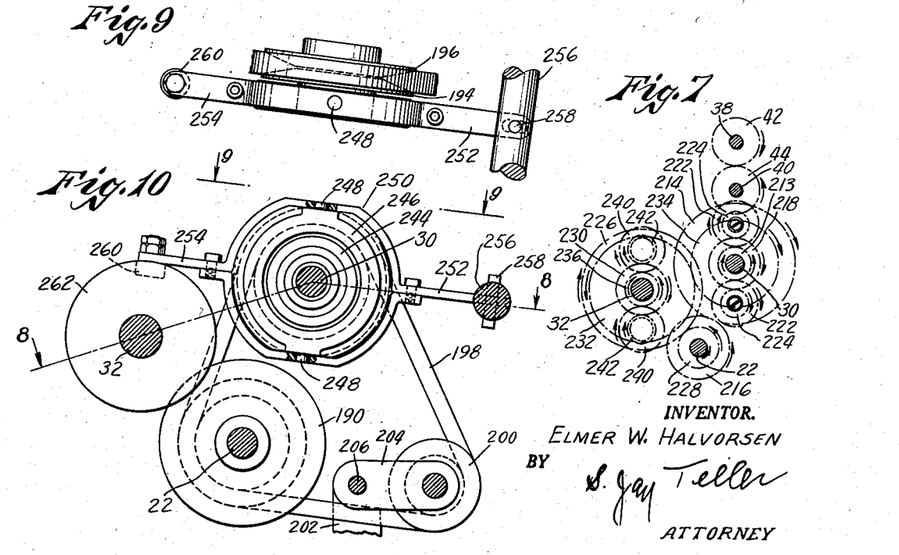
Fig. 7 is a diagrammatic view of the gearing, this view being taken along the line 7—7 of Fig. 6 and being on a reduced scale.
Fig. 9 is a fragmentary plan view taken along the line 9—9 of Fig. 10.
Fig. 10 is a fragmentary transverse sectional view taken along the line 10—10 of Fig. 6.

Referring particularly to Fig. 7, it will be seen that the gears 42 and 44 rotate respectively in the clockwise and counterclockwise directions, as indicated, when the feed rollers are in operation. The shaft 30 is connected with the gear 44 by means of the gears 48 and 46, which are omitted from Fig. 7 for greater clarity. The shaft 30 rotates in the clockwise direction, as does also the sun gear 218 secured to the shaft. The shaft 22 and the gear 216 carried thereby are rotated in the counterclockwise direction and therefore the sun gear 214 is rotated in the clockwise direction. The sun gear 213 which is driven by the variable speed pulleys 194 and 196 rotates in the same direction as the shaft 22, that is, in the counterclockwise direction, but the speed of rotation is variable.

In order that the operation may be more clearly understood, let it be assumed that the sun gear 213 is stationary (although it never is stationary). With the sun gear 213 stationary and with the planet pinion carrier gear 214 rotating in the clockwise direction, the planet pinions 222, 222 which mesh with the sun gear 213 will roll on the said sun gear and will be relatively rotated in the clockwise direction. The planet pinions 222, 222 are rigidly connected with the planet pinions 224, 224 and these latter pinions mesh with the sun gear 218. On account of the smaller diameters of the pinions 224, 224 the net result is that the sun gear 218 is rotated in the same direction as the planet pinion carrier gear, that is, in the clockwise direction, but at a lower speed. Actually, the sun gear 213 is not stationary as has been assumed, but it rotates in the counterclockwise direction. In so rotating it increases the speeds of clockwise rotation of the planet pinions 222, 222 and 224, 224 thus reducing the speed of rotation of the sun gear 218 in the clockwise direction. The ratios of the several pinions and gear are such that, when the speed of rotation of the sun gear 213 is increased to a predetermined maximum, the sun gear 218 is held stationary. Thus the sun gear 218 and the shaft 30 are stationary when the pulleys 194 and 196 and the sleeve 189 are at maximum speed, and the said pinion and shaft are rotated in the clockwise direction at progressively increasing speeds as the speed of the pulleys and sleeve is decreased.

The gearing for rotating the cam shaft 32 includes a planet pinion carrier gear 226 which is rotatable concentrically with respect to the cam shaft and which meshes with a gear 228 on the drive shaft 22. Inasmuch as the gear 228 is rotated in the counterclockwise direction, the sun gear 226 is rotated in the clockwise direction. Secured to the shaft 32 for rotation therewith is a sun gear 230 and as shown this gear 230 has a long hub on which the gear 226 rotates. Rotatably mounted on the shaft 32 is a gear 232 which meshes with a gear 234 rigidly secured to the intermediate shaft 30. The said gears are not shown in mesh in Fig. 6, but they are so shown in Fig. 8. The gear 234, while mounted on and secured to the intermediate shaft 30, is rotated indirectly by the rotatable sleeve 189 and by the variable speed mechanism, this being effected by the described gearing associated with the shaft 30. Rotatable with the gear 232 is a sun gear 236, the said gear having a long hub to which the gear 232 is secured. The sun gear 236 is immediately adjacent the sun gear 230.

Secured to the gear 226 are two bearing studs 238, 238 on which are mounted planet pinions 240, 240 and 242, 242. The planet pinions of each pair are rotatable in unison, one of them being mounted on the hub of the other. The planet pinions 240, 240 mesh with the sun gear 236 which is rotatable with the gear 232. The planet pinions 242, 242 mesh with the sun gear 230 which is rotatable with the shaft 32.

Referring particularly to Fig. 7, it will be seen that the gear 226 is rotated in the clockwise direction inasmuch as it meshes with the gear 228 on the shaft 22 which is rotated in the counterclockwise direction. The gear 232 and the sun gear 236 are rotated, if at all, in the counterclockwise direction inasmuch as the gear 232 meshes with the gear 234 which is rotated in the clockwise direction when it is rotated at all. It has already been stated that when the pulleys 194 and 196 and the sleeve 189 are at their maximum speed the pinion 218 and all parts directly connected therewith, including the shaft 30, are stationary. When this condition prevails, the gear 232 and the sun gear 236 are also stationary. Inasmuch as the gear 226 is rotating in the clockwise direction, the planet pinions 240, 240 roll around the stationary sun gear 236 and are rotated in the clockwise direction. On account of the smaller diameter of the planet pinions 242, 242 the sun gear 230 which meshes with the pinions 242, 242 is rotated in the clockwise direction but at a lower speed. The sun gear 230 is rigidly connected with the shaft 32 and therefore the shaft is rotated in the clockwise direction.

When the sun gear 236, instead of being held stationary, is rotated in the counterclockwise direction by reason of the rotation of the shaft 30 and the gear 234, the speed of rotation of the planet pinions 240, 240 and 242, 242 in the clockwise direction is increased. The speed of such rotation is dependent upon the speed of rotation of the shaft 30 and gear 234. This increase in speed of the planet pinions decreases the speed of rotation of the sun gear 230. The ratios of the several pinions and gears are such that said sun gear 230 and the shaft 32 are held stationary when the shaft 30 is at its maximum speed.

Means is provided for automatically adjusting the change speed or variable speed mechanism so that the rotatable member or sleeve is rotated alternately at two different normally fixed speeds, which will be designated as "first" and "second" speeds. Although the invention is not necessarily so limited, the "first" speed is preferably the lower speed and the "second" speed is preferably the higher speed. In describing the said means reference will be had particularly to Figs. 8, 9 and 10.

Figure 8:
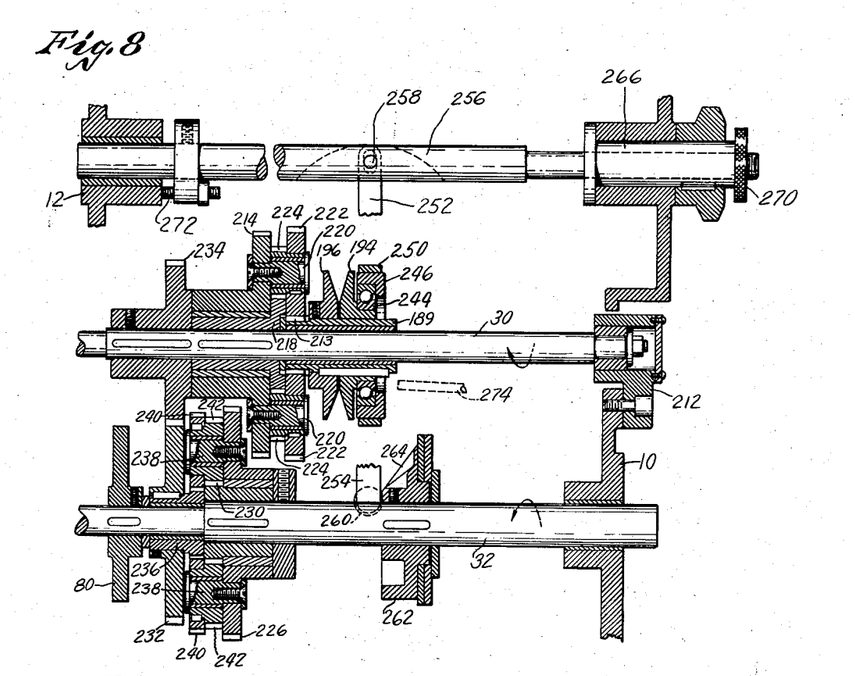
Fig. 8 is a longitudinal sectional view taken along the lines 8—8 of Figs. 1 and 10.

The operating and controlling means comprises a lever pivoted at one end and having a roller at the other end which engages a cam on the cam shaft. Between its ends the lever is connected with the bodily movable cone pulley 194 to move it longitudinally. Connected with the said pulley 194 is a ball bearing 244, the outer race of which is in engagement with a ring 246 having trunnions 248, 248. Embracing the ring 246 is a yoke 250 constituting a part of the said lever and having holes for receiving the trunnions 248, 248. Connected with the yoke 250 and completing the lever are oppositely extending arms 252 and 254. The arm 252 extends into a slot in a rod 256 where it is pivoted at 258. The other arm 254 carries a roller 260 which is positioned to engage the rearward face of a cam 262 secured to the cam shaft 32. The cam 262 has a flat rear face with which the roller 260 engages during the major portion of the rotation of the cam. The cam 262 is provided with a recess 264 into which the roller 260 moves when the recess is opposite the roller, the said recess having inclined sides. When the cam is rotated, the roller is repetitively and alternately engaged by the flat face of the cam and is permitted to enter the recess. Thus the pulley 194 is reciprocated between two positions to cause the sleeve 189 to rotate at two different speeds.

The extent of movement of the pulley 194 toward the pulley 196 is preferably adjustable in order to regulate the lower speed of the pulleys and of the sleeve 189, this lower speed corresponding to the speed of the shaft 30 during feeding and coiling. For this purpose, the rod 256 is longitudinally adjustable to move the pivot 258. The right end of the rod is threaded and it extends through a threaded bushing 266 rotatable in an opening in the front plate 10. The bushing 266 carries a knob 268 by means of which it may be turned. The bushing may be locked in adjusted position by means of a lock nut 270. It will be seen that the rod 256 is moved endwise when the knob 268 is turned. An adjustable stop 272 on the rod 256 limits movement thereof toward the left.

As has already been stated, the cam shaft 32 is stationary when the shaft 30 is at a predetermined maximum speed and when the pulleys 194 and 196 and the sleeve 189 are at a predetermined minimum or "first" speed. The predetermined minimum speed of the pulleys and sleeve is attained by adjusting the rod 256 toward the left to the extent permitted by the stop 272. With the rod in this position and with the roller 260 engaged with the flat rear face of the cam 262, the speed of the pulleys and the resulting speed of the shaft 30 is such as to maintain the shaft 32 stationary. If the shaft 32 is not held exactly stationary, the stop 272 can be adjusted to such extent as may be necessary.

As has already been stated, the shaft 30 is stationary when the pulleys 194 and 196 and the sleeve 189 are at a predetermined maximum or "second" speed. When the shaft 30 is stationary the cam shaft 32 rotates at its maximum speed. To attain maximum pulley speed the pulley 194 must move toward the right, and this occurs when the roller 260 enters the recess 264 in the cam 262. The extent of movement of the pulley toward the right must be accurately limited in order to attain the exact maximum speed that is necessary in order for the shaft 30 to be held stationary. In order to limit such movement of the pulley an adjustable stop is provided. As shown, this stop is in the form of a rod 274 carried by the front plate 10 and positioned at its inner end to engage the ring 246. The rod may conveniently extend through the bearing plate 212, in which it is threaded. The outer end of the rod is engageable by a wrench, and the rod can be adjusted to limit the movement of the pulley 194 so as to attain the exact maximum pulley speed necessary to hold the shaft 30 stationary when the roller 260 is in the cam recess 264. When the ring 246 is in engagement with the stop rod 274 the roller is in the cam recess 264, but not at the bottom thereof.

Operation

When the machine is to be used for coiling springs of definite lengths the pivot 258 is adjusted by means of the knob 268 to a position toward the right from that shown in Fig. 8, thus separating the pulley 194 from the pulley 196 and causing the pulleys and the sleeve 189 to rotate at a speed higher than the minimum speed. Thus the intermediate shaft 30 and the feed rollers are operated at a speed less than their maximum speed. By means of the gearing that has been described, the cam shaft 32 is rotated at a speed less than its maximum speed, this shaft making one complete rotation for each spring to be coiled. During the coiling operation the roller 260 remains engaged with the flat rear face of the cam 262. As the cam shaft rotates, the cams 118 and 162 and the associated mechanisms that have already been described serve to operate the diameter mechanism and the pitch mechanism to control the diameter and pitch of the spring as it is coiled.

Upon the completion of coiling the roller 260 moves into the recess 264 in the cam 262, thus permitting the pulley 194 to move toward the right to the extent permitted by the stop rod 274. This causes the pulleys 194 and 196 and the sleeve 189 to rotate at their maximum speeds and as already stated, the shaft 30 is then stationary and wire feeding is stopped. When the shaft 30 is stationary the cam shaft 32 rotates at its maximum speed and the timing is such that the cam 80 and the parts associated therewith operate the cutoff mechanism while the shaft 32 is operating at maximum speed. As soon as the cutoff operation is completed the roller 260 is forced out of the recess 264, and thereupon the several parts are restored to their former positions so as to resume feeding and effect the coiling of another spring.

It will be observed that during each cycle the speed of the pulleys 194 and 196 and of the sleeve 189 is alternately changed from a lower speed to a maximum speed and then back to the lower speed. Inasmuch as this is done by the shifting of the cone pulleys and by the adjustment of the belt, the changes are effected gradually and thus the feeding is stopped and started gradually without any sudden shock. The cam shaft rotates at less than its maximum speed during coiling but operates at its maximum speed during cutoff, thus effecting a considerable saving in time. This is in contrast with prior machines wherein the cam shaft is operated at a continuous speed. For a long spring the cam shaft was necessarily rotated very slowly and the result was that much time was wasted in the very slow operation of the cutoff mechanism. With the present construction the cutoff mechanism operates at maximum speed under all conditions regardless of the length of the spring.

The shape and pattern of the spring are controlled, as already described, by the diameter mechanism and by the pitch mechanism and the length of the spring can be varied by changing the position of the pivot 258 to adjust the "first" speed of the rotatable member or sleeve 189. For a shorter spring the pivot is moved toward the right and for a longer spring the pivot is moved toward the left. It will be seen that the speed of the wire feed varies with the length of the spring, being higher for long springs and lower for short springs.

The "first" or lower speed of the pulleys 194 and 196 is adjustable as described, but the "second" or higher speed is always the same, after the necessary adjustment of the stop rod 274 has been made. As the said first speed is adjusted the speed of the intermediate shaft 30 varies inversely therewith, and the lower speed of the cam shaft 32 varies directly therewith. For longer springs, the speed of the intermediate shaft and the speed of feeding and coiling are increased and the speed of the cam shaft is decreased, and for shorter springs the speed of the intermediate shaft and the speed of feeding and coiling are decreased and the speed of the cam shaft is increased.

For coiling a continuous spring the pivot 258 is adjusted to its extreme left position as determined by the stop 272. With the pivot in this position the shaft 30 operates at maximum speed and the cam shaft 32 is stationary. Inasmuch as the cam shaft 32 is stationary the cutoff mechanism does not operate. For a continuous spring the diameter mechanism may be adjusted so that the cam 118 is inoperative, the diameter being determined by the screw 148 and the knob 150. The pitch mechanism may be adjusted so that the cam 162 is inoperative, the pitch being controlled by the set screws 188, 188.

It will be observed that the power for rotating the shafts 30 and 32 is transmitted in part through the gearing connecting the shaft 22 with the shafts 30 and 32 and in part through the variable speed mechanism connecting the shaft 22 with the shaft 30. In fact, only a small portion of the power is transmitted through the variable speed mechanism, this mechanism serving chiefly to control the said gearing which constitutes the principal power transmitting means. Therefore, the variable speed mechanism can be of relatively small capacity and it can be readily operated to change the speed.

The invention claimed is:

1. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a change speed mechanism connected with the drive shaft, a rotatable member driven by the change speed mechanism, a rotatable cam shaft, means operable repetitively by the cam shaft during rotation thereof for adjusting the change speed mechanism to rotate the rotatable member alternately at two different normally fixed speeds, gearing connected with the rotatable member and serving upon rotation of the member at one said speed to rotate the intermediate shaft in the direction to rotate the feed rollers so as to effect feeding and coiling, the said gearing serving upon rotation of the member at the other said speed to maintain the intermediate shaft and the feed rollers stationary so as to discontinue feeding and coiling, and a means actuated by the cam shaft for operating the cutoff mechanism when the intermediate shaft and the feed rollers are stationary.

2. The combination in a spring coiling machine as set forth in claim 1, wherein the intermediate shaft is rotated upon rotation of the rotatable member at its lower speed and is maintained stationary upon rotation of the rotatable member at its higher speed.

3. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a variable speed drive mechanism connected with the drive shaft, a rotatable member driven by the variable speed mechanism, a rotatable cam shaft, means operable repetitively by the cam shaft during rotation thereof for adjusting the variable speed mechanism to rotate the rotatable member alternately at two different normally fixed speeds, manually controlled means for adjusting the variable speed drive mechanism to change one of the said alternate normally fixed speeds while the other of the said speeds remains unchanged, gearing connected with the rotatable member and serving upon rotation of the member at the said manually adjusted speed to rotate the intermediate shaft at a speed dependent on that of the rotatable member and in the direction to rotate the feed rollers so as to effect feeding and coiling, the said gearing serving upon rotation of the member at the other said speed to maintain the intermediate shaft and the feed rollers stationary so as to discontinue feeding and coiling, and means actuated by the cam shaft for operating the cutoff mechanism when the intermediate shaft and the feed rollers are stationary.

4. The combination in a spring coiling machine as set forth in claim 3, wherein the gearing serves to rotate the intermediate shaft at speeds varying inversely with the manually adjusted speed of the rotatable member.

5. The combination in a spring coiling machine as set forth in claim 3, wherein the manually controlled means serves to change the lower of the two different normally fixed speeds of the rotatable member, wherein the gearing connected with the rotatable member serves to rotate the intermediate shaft and the feed rollers at speeds which vary inversely with the adjustment of the said lower speed of the rotatable member, and wherein the said gearing serves upon rotation of the rotatable member at its higher speed to maintain the intermediate shaft and the feed rollers stationary.

6. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a change speed drive mechanism connecting the said drive shaft with the said sleeve, a rotatable cam shaft, means repetitively operable by the cam shaft during rotation thereof for adjusting the change speed mechanism to rotate the sleeve alternately at two different normally fixed speeds, gearing connected with the sleeve and serving upon rotation of the sleeve at one said speed to rotate the intermediate shaft in the direction to rotate the feed rollers so as to effect feeding and coiling, the said gearing serving upon rotation of the sleeve at the other said speed to maintain the intermediate shaft and the feed rollers stationary so as to discontinue feeding and coiling, and a means actuated by the cam shaft for operating the cutoff mechanism when the intermediate shaft and the feed rollers are stationary.

7. The combination in a spring coiling machine as set forth in claim 6, wherein the intermediate shaft is rotated upon rotation of the rotatable sleeve at its lower speed and is maintained stationary upon rotation of the rotatable sleeve at its higher speed.

8. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a variable speed drive mechanism connecting the said drive shaft with the said sleeve, a rotatable cam shaft, means repetitively operable by the cam shaft during rotation thereof for adjusting the variable speed mechanism to rotate the sleeve alternately at two different normally fixed speeds, manually controlled means for adjusting the variable speed drive mechanism to change one of the said alternate normally fixed speeds while the other of the said speeds remains unchanged, gearing connected with the rotatable sleeve and serving upon rotation of the sleeve at the said manually adjusted speed to rotate the intermediate shaft at a speed dependent on that of the rotatable sleeve and in the direction to rotate the feed rollers so as to effect feeding and coiling, the said gearing serving upon rotation of the sleeve at the other said speed to maintain the intermediate shaft and the feed rollers stationary so as to discontinue feeding and coiling, and a means actuated by the cam shaft for operating the cutoff mechanism when the intermediate shaft and the feed rollers are stationary.

9. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a variable speed drive mechanism connecting the said drive shaft with the said sleeve and comprising a pair of cone pulleys on the drive shaft one of which is bodily movable toward and from the other and a pair of cone pulleys on the sleeve one of which is bodily movable toward and from the other and also comprising an endless belt passing over and engaging the pulleys, a rotatable cam shaft, means repetitively operable by the cam shaft during rotation thereof for changing the position of at least one of the bodily movable pulleys to rotate the sleeve alternately at two different normally fixed speeds, gearing connected with the sleeve and serving upon rotation of the sleeve at one said speed to rotate the intermediate shaft in the direction to rotate the feed rollers so as to effect feeding and coiling, the said gearing serving upon rotation of the sleeve at the other speed to maintain the intermediate shaft and the feed rollers stationary so as to discontinue feeding and coiling, and a means actuated by the cam shaft for operating the cutoff mechanism when the intermediate shaft and the feed rollers are stationary.

10. The combination in a spring coiling machine as set forth in claim 9, wherein there is an adjustable stop for limiting the movement of at least one of the bodily movable pulleys in one direction so as to rotate the sleeve at the exact speed that is necessary to maintain the intermediate shaft and feed rollers stationary.

11. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a change speed drive mechanism connecting the said drive shaft with the said sleeve, a rotatable cam shaft, means repetitively operable by the cam shaft during rotation thereof for adjusting the change speed mechanism to rotate the sleeve alternately at two different normally fixed speeds, a sun gear on the rotatable sleeve, a planet pinion carrier gear rotatable on the intermediate shaft, a gear on the drive shaft meshing with the said carrier gear to rotate it at constant speed, a sun gear secured to the intermediate shaft adjacent the said carrier gear and having a diameter different from that of the first said sun gear, pairs of connected planet pinions of different diameters carried by said carrier gear, the planet pinions of each pair meshing respectively with the said sun gears and the ratios of the several gears and pinions being such that the intermediate shaft and feed rollers are rotated to effect feeding and coiling when the sleeve is rotated at one said speed and are maintained stationary to discontinue feeding and coiling when the sleeve is rotated at the other said speed, and a means actuated by the cam shaft for operating the cutoff mechanism when the intermediate shaft and the feed rollers are stationary.

12. The combination in a spring coiling machine are set forth in claim 11, wherein the intermediate shaft is rotated upon rotation of the sleeve at its lower speed and is maintained stationary upon rotation of the sleeve at its higher speed.

13. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a pair of cone pulleys on the drive shaft one of which is bodily movable toward and from the other, a pair of cone pulleys on the sleeve one of which is bodily movable toward and from the other, an endless belt passing over the said cone pulleys, a rotatable cam shaft, means repetitively operable by the cam shaft during rotation thereof for changing the position of at least one of the bodily movable pulleys to cause the sleeve to rotate alternatively at two different normally fixed speeds, a sun gear on the rotatable sleeve, a planet pinion carrier gear rotatable on the intermediate shaft, a gear on the drive shaft meshing with said carrier gear to rotate it at constant speed, a sun gear secured to the intermediate shaft adjacent said carrier gear and having a diameter different from that of the first said sun gear, pairs of connected planet pinions of different diameters carried by said carrier gear, the planet gears of each pair meshing respectively with said sun gears and the ratios of the several gears and pinions being such that the intermediate shaft and feed rollers are rotated to effect feeding and coiling when the sleeve is rotated at one said speed and are maintained stationary to discontinue feeding and coiling when the sleeve is rotated at the other said speed, and a means actuated by the cam shaft for operating the cutoff mechanism when the intermediate shaft and the feed rollers are stationary.

14. The combination in a spring coiling machine as set forth in claim 13, wherein there is an adjustable stop for limiting the movement of at least one of the bodily movable pulleys in one direction so as to rotate the sleeve at the exact speed that is necessary to maintain the intermediate shaft and feed rollers stationary.

15. In a spring coiling machine, the combination of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a sleeve rotatable on the intermediate shaft, a pair of cone pulleys on the drive shaft one of which is bodily movable toward and from the other, a pair of cone pulleys on the sleeve one of which is bodily movable toward and from the other, an endless belt passing over the said cone pulleys, a pivoted lever connected with one of the said bodily movable pulleys, a rotatable cam shaft having a cam which engages the lever and serves to move the lever about its pivot and to thereby move the said bodily movable pulley alternately to two different positions so as to cause the sleeve to rotate at two different normally fixed speeds, a sun gear on the rotatable sleeve, a planet pinion carrier gear rotatable on the intermediate shaft, a gear on the drive shaft meshing with said carrier gear to rotate it at constant speed, a sun gear secured to the intermediate shaft adjacent said carrier gear and having a diameter different from that of the first said sun gear, pairs of connected planet pinions of different diameters carried by said carrier gear, the planet pinions of each pair meshing respectively with said sun gears and the ratios of the several gears and pinions being such that the intermediate shaft and feed rollers are rotated to effect feeding and coiling when the sleeve is rotated at one said speed and are maintained stationary to discontinue feeding and coiling when the sleeve is rotated at the other said speed, and a means actuated by the cam shaft for operating the cutoff mechanism when the intermediate shaft and the feed rollers are stationary.

16. The combination in a spring coiling machine as set forth in claim 15, wherein a means is provided for adjusting the pivot of the lever to vary one of the positions to which the bodily movable pulley is moved by the cam and the lever.

17. The combination in a spring coiling machine, of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, repetitively acting means for rotating the intermediate shaft to effect feeding and coiling and for stopping the intermediate shaft to discontinue feeding and coiling, a rotatable cam shaft, a change speed drive mechanism connected with the drive shaft, a rotatable member driven by the variable speed mechanism, means operable in timed relationship with the intermediate shaft for adjusting the change speed mechanism to rotate the rotatable member at one speed when the intermediate shaft is rotating and at another speed when the intermediate shaft is stationary, gearing connected with the rotatable member and serving upon rotation of the member at the first said speed to rotate the cam shaft at a relatively low speed and serving upon rotation of the member at the second said speed to rotate the cam shaft at a high speed, and means actuated by the cam shaft while rotating at its high speed for operating the cutoff mechanism.

18. The combination in a spring coiling machine as set forth in claim 17, wherein the cam shaft is rotated at its lower speed when the rotatable member is rotated at its lower speed and wherein the cam shaft is rotated at its higher speed when the rotatable member is rotated at its higher speed.

19. The combination in a spring coiling machine, of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, repetitively acting means for rotating the intermediate shaft to effect feeding and coiling and for stopping the intermediate shaft to discontinue feeding and coiling, a rotatable cam shaft, a variable speed drive mechanism connected with the drive shaft, a rotatable member driven by the variable speed mechanism, means operable in timed relationship with the intermediate shaft for adjusting the variable speed mechanism to rotate the rotatable member at one speed when the intermediate shaft is rotating and at another speed when the intermediate shaft is stationary, gearing connected with the rotatable member and serving upon rotation of the member at the first said speed to rotate the cam shaft at a relatively low speed and serving upon rotation of the member at the second said speed to rotate the cam shaft at a high speed, manually controlled means for adjusting the variable speed drive mechanism to change the relatively low speed of the cam shaft while the high speed thereof remains unchanged, and means actuated by the cam shaft while rotating at its high speed for operating the cutoff mechanism.

20. The combination in a spring coiling machine, of wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, repetitively acting means for rotating the intermediate shaft to effect feeding and coiling and for stopping the intermediate shaft to discontinue feeding and coiling, a rotatable cam shaft, a variable speed drive mechanism connected with the drive shaft, a rotatable member driven by the variable speed mechanism, means repetitively operable in timed relationship with the intermediate shaft for adjusting the variable speed mechanism to rotate the rotatable member at one speed when the intermediate shaft is rotating and at another speed when the intermediate shaft is stationary, manually controlled means for adjusting the variable speed drive mechanism to change the first said speed of the rotatable member while the second said speed remains unchanged, gearing connected with the rotatable member and serving upon rotation of the member at the first said speed and in accordance with the manual adjustment of the said speed either to rotate the cam shaft at a relatively low speed or to hold it stationary, the said gearing serving upon rotation of the member at the second said speed to rotate the cam shaft at a high speed, and means actuated by the cam shaft while rotating at its high speed for operating the cutoff mechanism.

21. The combination in a spring coiling machine as set forth in claim 20, wherein there is an adjustable stop for limiting the manual adjustment of the variable speed mechanism so as to rotate the rotatable member at the exact speed that is necessary to hold the cam shaft stationary.

22. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a change speed mechanism connected with the drive shaft, a rotatable member driven by the change speed mechanism, means operable repetitively by the cam shaft during rotation thereof for adjusting the change speed mechanism to rotate the rotatable member alternatively at two different normally fixed first and second speeds, gearing connecting the rotatable member with the intermediate shaft and with the cam shaft and serving upon rotation of the member at the first speed to rotate the intermediate shaft in the direction to rotate the feed rollers so as to effect feeding and coiling and to rotate the cam shaft at a relatively low speed, the said gearing serving upon rotation of the member at the second speed to maintain the intermediate shaft and the feed rollers stationary so as to discontinue feeding and coiling and to rotate the cam shaft at a high speed, and a means actuated by the cam shaft when rotating at high speed for operating the cutoff mechanism.

23. The combination in a spring coiling machine as set forth in claim 22, wherein there are means actuated by the cam shaft when rotating at its relatively low speed for operating the coiling mechanism.

24. The combination in a spring coiling machine as set forth in claim 22, wherein the first speed of the rotatable member is a relatively low speed and wherein the second speed thereof is a relatively high speed.

25. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a variable speed mechanism connected with the drive shaft, a rotatable member driven by the variable speed mechanism, means operable repetitively by the cam shaft during rotation thereof for adjusting the variable speed mechanism to rotate the rotatable member alternatively at two different normally fixed first and second speeds, gearing connecting the rotatable member with the intermediate shaft and with the cam shaft and serving upon rotation of the member at the first speed to rotate the intermediate shaft in the direction to rotate the feed rollers and thereby effect feeding and coiling and to rotate the cam shaft at a relatively low speed, the said gearing serving upon rotation of the member at the second speed to maintain the intermediate shaft and the feed rollers stationary and thereby discontinue feeding and coiling and to rotate the cam shaft at a high speed, manually controlled means for adjusting the variable speed drive mechanism to change the first speed of the rotatable member while the second speed thereof remains unchanged, the said means thus serving to change the speed of wire feed and coiling and to change the relatively low speed of the cam shaft, and a means actuated by the cam shaft when rotating at high speed for operating the cutoff mechanism.

26. The combination in a spring coiling machine as set forth in claim 25, wherein the gearing serves to rotate the intermediate shaft and the cam shaft at speeds which vary inversely with respect to each other as the first speed of the rotatable member is adjusted.

27. The combination in a spring coiling machine as set forth in claim 25, wherein the gearing serves to rotate the intermediate shaft at speeds varying inversely with the manually adjusted first speed of the rotatable member and wherein the said gearing serves to rotate the cam shaft at speeds varying directly with the said manually adjusted first speed of the rotatable member.

28. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a change speed mechanism connected with the drive shaft, a rotatable member driven by the change speed mechanism, means operable repetitively by the cam shaft during rotation thereof for adjusting the change speed mechanism to rotate the rotatable member alternatively at two different normally fixed first and second speeds, manually controlled means for adjusting the variable speed drive mechanism to change the first speed of the rotatable member while the second speed thereof remains unchanged, gearing connecting the rotatable member with the intermediate shaft and with the cam shaft and serving upon rotation of the member at the first speed to rotate the intermediate shaft in the direction to rotate the feed rollers so as to effect feeding and coiling and serving upon rotation of the member at the first speed and in accordance with the manual adjustment of the said speed either to rotate the cam shaft at a relatively low speed or to hold it sationary, the said gearing also serving upon rotation of the member at the second speed to maintain the intermediate shaft and the feed rollers stationary so as to discontinue feeding and coiling and to rotate the cam shaft at a high speed, and a means actuated by the cam shaft when rotating at high speed for operating the cutoff mechanism.

29. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a change speed mechanism connected with the drive shaft, a rotatable sleeve on the intermediate shaft driven by the change speed mechanism, means operable repetitively by the cam shaft during rotation thereof for adjusting the change speed mechanism to rotate the sleeve alternatively at two different normally fixed first and second speeds, gearing connecting the sleeve with the intermediate shaft and with the cam shaft and serving upon rotation of the sleeve at the first speed to rotate the intermediate shaft in the direction to rotate the feed rollers so as to effect feeding and coiling and to rotate the cam shaft at a relatively low speed, the said gearing serving upon rotation of the sleeve at the second speed to maintain the intermediate shaft and the feed rollers stationary so as to discontinue feeding and coiling and to rotate the cam shaft at a high speed, and a means actuated by the cam shaft when rotating at high speed for operating the cutoff mechanism.

30. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a rotatable sleeve on the intermediate shaft, a variable speed mechanism connecting the drive shaft with the sleeve and comprising a pair of cone pulleys on the drive shaft one of which is bodily movable toward and from the other and a pair of cone pulleys on the sleeve one of which is bodily movable toward and from the other and also comprising an endless belt passing over and engaging the pulleys, means operable repetitively by the cam shaft during rotation thereof for changing the position of at least one of the bodily movable pulleys to rotate the sleeve alternatively at two different normally fixed first and second speeds, gearing connecting the sleeve with the intermediate shaft and with the cam shaft and serving upon rotation of the sleeve at the first speed to rotate the intermediate shaft in the direction to rotate the feed rollers so as to effect feeding and coiling and to rotate the cam shaft at a relatively low speed, the said gearing serving upon rotation of the sleeve at the second speed to maintain the intermediate shaft and the feed rollers stationary so as to discontinue feeding and coiling and to rotate the cam shaft at a high speed, and a means actuated by the cam shaft when rotating at high speed for operating the cutoff mechanism.

31. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a change speed mechanism connected with the drive shaft, a rotatable sleeve on the intermediate shaft driven by the change speed mechanism, means operable repetitively by the cam shaft during rotation thereof for adjusting the change speed mechanism to rotate the sleeve alternatively at two different normally fixed first and second speeds, gearing connecting the sleeve with the intermediate shaft and with the cam shaft and including planetary gearing on the intermediate shaft and planetary gearing on the cam shaft, the connecting gearing serving upon rotation of the sleeve at the first speed to rotate the intermediate shaft in the direction to rotate the feed rollers so as to effect feeding and coiling and to rotate the cam shaft at a relatively low speed and the said connecting gearing serving upon rotation of the sleeve at the second speed to maintain the intermediate shaft and the feed rollers stationary so as to discontinue feeding and coiling and to rotate the cam shaft at a high speed, and a means actuated by the cam shaft when rotating at high speed for operating the cutoff mechanism.

32. A spring coiling machine comprising in combination, wire feed rollers, spring coiling mechanism positioned to coil the wire after it has passed the rollers, cutoff mechanism positioned to cut the wire after it has been coiled, a constant speed drive shaft, an intermediate shaft geared to the feed rollers, a rotatable cam shaft, a change speed mechanism connected with the drive shaft, a rotatable sleeve on the intermediate shaft driven by the change speed mechanism, means operable repetitively by the cam shaft during rotation thereof for adjusting the change speed mechanism to rotate the sleeve alternatively at two different normally fixed speeds, a sun gear on the rotatable sleeve, a planet pinion carrier gear rotatable on the intermediate shaft, a gear on the drive shaft meshing with the said carrier gear to rotate it at constant speed, a sun gear secured to the intermediate shaft adjacent said carrier gear and having a diameter different from that of the first said sun gear, pairs of connected planet pinions of different diameters carried by the said carrier gear, the planet pinions of each pair meshing respectively with said sun gears and the ratios of the several gears and pinions being such that the intermediate shaft and feed rollers are rotated to effect feeding and coiling when the sleeve is rotated at one said speed and are maintained stationary to discontinue feeding and coiling when the sleeve is rotated at the other said speed, a gear rotatable on the cam shaft, a gear secured to the intermediate shaft and meshing with the said gear on the cam shaft, a sun gear rotatable on the cam shaft in unison with the first said gear thereon, a planet pinion carrier gear rotatable on the cam shaft, a gear on the drive shaft meshing with the last said carrier gear to rotate it at constant speed, a sun gear secured to the cam shaft adjacent the last said carrier gear and having a diameter different from that of the first said sun gear on the cam shaft, pairs of connected planet pinions of different diameters carried by the last said carrier gear, the planet pinions of each pair meshing respectively with said sun gears on the cam shaft and the ratio of the last said several gears and pinions being such that the cam shaft is rotated at a relatively high speed when the rotatable sleeve is rotated at its maximum speed and the intermediate shaft is stationary and being such that the cam shaft is rotated at a lower speed when the rotatable sleeve is rotated at its lower speed and the intermediate shaft is rotated, and a means actuated by the cam shaft when rotating at high speed for operating the cutoff mechanism.

33. The combination in a spring coiling machine as set forth in claim 31, wherein the change speed gearing is of the variable speed type and comprises a pair of cone pulleys on the drive shaft one of which is bodily movable toward and from the other, a pair of cone pulleys on the sleeve one of which is bodily movable toward and from the other and an endless belt passing over the said cone pulleys, and wherein the means for adjusting the variable speed mechanism serves to change the position of at least one of the bodily movable pulleys to cause the sleeve to rotate alternately at two different speeds.

34. The combination in a spring coiling machine as set forth in claim 31, wherein the change speed gearing is of the variable speed type and comprises a pair of cone pulleys on the drive shaft one of which is bodily movable toward and from the other, a pair of cone pulleys on the sleeve one of which is bodily movable toward and from the other and an endless belt passing over the said cone pulleys, wherein the means for adjusting the variable speed mechanism is a cam actuated pivoted lever connected with one of the bodily movable pulleys to change the position thereof and cause the sleeve to rotate at two different speeds, and wherein means is provided for moving the pivot of the lever to change one of the normally fixed speeds of the sleeve.

35. A wire coiling machine comprising wire feed rollers, coiling mechanism positioned to coil the wire after it has passed the rollers, cut off mechanism positioned to sever the coiled wire, a drive shaft, a differential change speed mechanism connecting the shaft with the rollers and operable to drive the latter at rates varying with respect to that of the drive shaft, a cam shaft driven by the drive shaft, a cam mechanism connected with the cam shaft and operating to control the differential mechanism and cause it to drive the rollers at rates varying from zero to a maximum, and cam controlled means connected with the cam shaft and operable to cause the cut off mechanism to sever the wire when the feed rollers are held stationary by the differential mechanism under the control of the cam mechanism.

36. A machine according to claim 35 comprising mechanism for rotating the cam shaft at a rate which decreases as the roller speed is increased so as to provide time to feed a long length of wire during a partial rotation of the cam shaft and which cam shaft rate increases towards a maximum as the roller feed rate approaches zero so as to save time in effecting the wire severing.

37. A machine according to claim 35 comprising mechanism to rotate the cam shaft at a rate which is inversely proportional to the feed roller rate.

38. A machine according to claim 35 comprising a second differential speed change mechanism which governs the cam shaft rate, and means interconnecting the two differential mechanisms which causes the cam shaft to move at a rate in an inverse ratio to the feed roller rate.

39. A machine according to claim 35 comprising means for adjusting the differential speed mechanism while the machine is running so as to vary the feed roller rate.

ELMER W. HALVORSEN.

REFERENCES CITED

The following references are of record in the file of this patent:

UNITED STATES PATENTS

| Number | Name | Date |
| --- | --- | --- |
| 2,038,860 | Stewart | Apr. 28, 1936 |
| 2,096,605 | Blount | Oct. 19, 1937 |
| 2,135,729 | Olgay | Nov. 8, 1938 |
| 2,161,894 | Bishop | June 13, 1939 |
| 2,175,426 | Blount | Oct. 10, 1939 |
| 2,260,053 | Platt | Oct. 21, 1941 |